United States Patent
Sun et al.

(10) Patent No.: US 8,211,397 B2
(45) Date of Patent: *Jul. 3, 2012

(54) PROCESS OF PRECIPITATION FOR SPHERIC MANGANESE CARBONATE AND THE PRODUCTS PRODUCED THEREBY

(75) Inventors: Yang Kook Sun, Seoul (KR); Doo Kyun Lee, Seoul (KR); Sang Ho Park, Seoul (KR)

(73) Assignee: SK Innovation Co., Ltd, Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 11/909,806

(22) PCT Filed: Mar. 30, 2006

(86) PCT No.: PCT/KR2006/001170
§ 371 (c)(1),
(2), (4) Date: Nov. 5, 2007

(87) PCT Pub. No.: WO2006/109940
PCT Pub. Date: Oct. 19, 2006

(65) Prior Publication Data
US 2008/0219911 A1     Sep. 11, 2008

(30) Foreign Application Priority Data
Mar. 30, 2005     (KR) .................. 10-2005-0026448

(51) Int. Cl.
*C01B 31/24* (2006.01)
(52) U.S. Cl. ............... 423/420.2; 423/419.1; 429/218.1; 429/224
(58) Field of Classification Search ............... 423/419.1, 423/420.2; 429/218.1, 220, 221, 223, 224, 429/229, 231.9, 231.95
See application file for complete search history.

(56) References Cited

U.S. PATENT DOCUMENTS

| | | | |
|---|---|---|---|
| 2003/0170540 A1* | 9/2003 | Ohzuku et al. | 429/231.1 |
| 2005/0058588 A1* | 3/2005 | Kang et al. | 423/420.2 |
| 2008/0193841 A1* | 8/2008 | Sun et al. | 429/220 |

FOREIGN PATENT DOCUMENTS

| | | |
|---|---|---|
| KR | 19990034480 | 5/1999 |
| KR | 2001-148249 | 5/2001 |
| KR | 20020039944 | 5/2002 |

(Continued)

OTHER PUBLICATIONS

E. Uzinova et al., "Synthesis and Characterization of Manganese-Containing Binary Spinel Oxides", Bulgarian Chemistry and Industry, vol. 71, No. 3, 2000, pp. 90-92, XP002630300, paragraph [experimental], table 1.

(Continued)

*Primary Examiner* — Stanley Silverman
*Assistant Examiner* — Brian Walck
(74) *Attorney, Agent, or Firm* — Gottlieb, Rackman & Reisman, P.C.

(57) ABSTRACT

Disclosed herein are a manganese carbonate useful as a material for spinel-type $LiMn_2O_4$, having a spherical morphology, and a method of preparing the same. The spheric manganese carbonate has a high packing density and shows superior lifetime characteristics, leading to spinel-type $LiMn_2O_4$ resistant to structural changes and having superior lifetime characteristics.

5 Claims, 2 Drawing Sheets

FOREIGN PATENT DOCUMENTS

| | | |
|---|---|---|
| KR | 20020054534 | 7/2002 |
| KR | 2004-227790 | 8/2004 |
| KR | 2004-241242 | 8/2004 |

OTHER PUBLICATIONS

Y. J. Lee et al., "Structural relaxation in the MnCO3-CaCO3 solid solution: a Mn K-edge EXAFS study", Physics and Chemistry of Minerals, vol. 29, No. 9, 2002, pp. 585-584, XP002630301, paragraph [experimental], table 1.

Ikram UL Haq et al., Preparation and Properties of Uniform Coated Inorganic Colloidal Particles. 11. Nickel and Its Compounds on Manganese Compounds, Chemistry of Materials, vol. 9, 1997, pp. 2659-2665, XP002630302, D01: 10.1021/cm970218t, paragraphs [results], [experimental].

Shuichi Hamada et al., "Preparation of monodispersed manganese (IV) oxide particles from manganese (II) carbonate", Journal of Colloid and Interface Science, vol. 118, No. 2, 1987, pp. 356-365, XP002630303, paragraphs ["Result and Discussion"]; Figures 1, 2.

Supplemental European Search Report issued in the counterpart European Patent Application No. 06732745.2., European Patent Office, Apr. 26, 2011.

* cited by examiner

PROCESS OF PRECIPITATION FOR SPHERIC MANGANESE CARBONATE AND THE PRODUCTS PRODUCED THEREBY

TECHNICAL FIELD

The present invention relates to a manganese carbonate for use in lithium ion secondary batteries. More particularly, the present invention relates to a spheric manganese carbonate useful as a material for cathode active materials of secondary batteries, leading to spinel-type $LiMn_2O_4$, which has a high packing density and superior lifetime characteristics.

BACKGROUND ART

Since their commercialization by Sony Corporation in 1991, lithium ion secondary batteries have been used as a mobile power source in a broad spectrum of portable electric appliances. With recent great advances in the electronic, communication, and computer industries, high performance electronic and communication products, such as mobile phones, camcorders, laptop PCs, etc., have been developed, partly on the basis of lithium ion secondary batteries being available as power sources therefor. In advanced countries, such as America, Japan, and European countries, furthermore, active research has been conducted into power sources for hybrid automobiles, in which internal combustion engines are associated with lithium ion secondary batteries.

Readily commercially available, small lithium ion secondary batteries employ $LiCoO_2$ for a cathode and carbon for an anode. $LiCoO_2$ shows stable charge and discharge characteristics, excellent electron conductivity, high stability and flat discharge voltage characteristics, but the component cobalt is expensive due to small deposits, and is hazardous to the body. Thus, alternative materials are now required for the cathode of lithium ion secondary batteries. $LiNiO_2$, $LiCo_xNi_{1-x}O_2$, and $LiMn_2O_4$ are now under extensive study as cathode materials of lithium ion secondary batteries. $LiNiO_2$ cannot be commercialized at present due to its difficulty in being stoichiometrically synthesized as well as its low thermal stability, although it has the same layered structure as that of $LiCoO_2$. $LiMn_2O_4$ incurs a low cost in the production thereof and is environmentally friendly, but shows poor lifetime characteristics due to the structural phase transition Jahn-Teller distortion, and Mn dissolution, both attributable to $Mn^{3+}$. Particularly, the Mn dissolution, resulting from the reaction of Mn with electrolytes, causes a great decrease in lifetime at high temperatures, acting as a hindrance to the commercialization of the rechargeable lithium ion battery.

Japanese Pat. Laid-Open Publication No. 2004-227790 discloses a lithium transition metal complex oxide having a spinel structure, produced as a cathode active material for secondary lithium ion batteries through sodium hydrogen carbonate coprecipitation, which shows a heat generation starting temperature of 220° C. or higher and excellent cell characteristics even under poor circumstances. Also, Japanese Pat Laid-Open Publication No. 2004-241242 discloses a lithium transition metal complex oxide having a spinel structure, produced as a cathode active material for secondary lithium ion batteries through sodium hydrogen coprecipitation, comprising a first and a second particle component, which are 1 to 50 μm and 8 to 50 μm, respectively. Japanese Pat. Laid-Open Publication No. discloses a spinel-type lithium manganese complex oxide having 5V capacity, represented by $LiNi_{0.5}Mn_{1.5}O_4$, for cathode material, which is prepared using ammonium carbonate and shows high energy density and a superior life cycle even at high temperatures.

Conventional manganese carbonates, as described above, can be prepared using carbonate coprecipitation. However, crystals of the manganese carbonates thus obtained are not spherical, but are irregular in shape, with a broad particle distribution. Such irregularly shaped manganese carbonates with a broad particle distribution are poor in packing density and have a large specific surface in contact with the electrolytes, so that they dissolve in the electrolytes. Therefore, a higher packing density and a lower specific surface can be achieved with spheric monodispersed manganese carbonates. Spinel-type $LiMn_2O_4$ active materials, which are constant in shape, can be prepared with the spheric manganese carbonate serving as a starting material.

DISCLOSURE

Technical Problem

Figure 1:
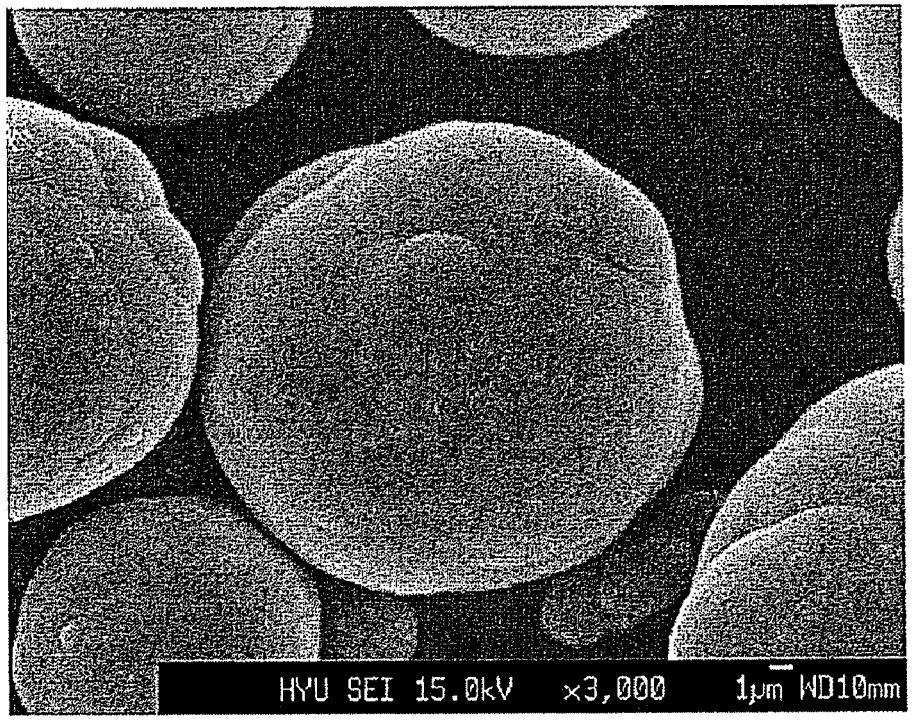
FIG. 1 is an FE-SEM photograph of 3,000 power magnifications showing the surface morphology of the $(Mn_{0.95}Mg_{0.05})_2O_3$ precursor obtained by calcining a powder of the manganese carbonate of the present invention for 10 hours at 500° C.

Therefore, the present invention has been made keeping in mind the above problems occurring in the prior art, and it is an object of the present invention to provide spheric manganese carbonates, useful as a starting material for the preparation of spinel-type $LiMn_2O_4$, and a process for the preparation thereof.

Technical Solution

Leading to the present invention, intensive and thorough research into cathode active materials for secondary lithium ion batteries, conducted by the present inventors, resulted in the finding that the use of the reducing agent hydrazine in carbonate coprecipitation prevents manganese, which rapidly reacts, from being oxidized, thereby allowing the formation of spheric manganese carbonate.

Advantageous Effects

The spheric manganese carbonate prepared in accordance with the present invention has a narrow particle distribution so as to show a high packing density and superior lifetime characteristics. Therefore, it is useful as a material for the cathode active material, represented by $Li[Mn_{1-x}M_x]_2O_4$, of secondary batteries.

BEST MODE

For preparing spheric complex manganese carbonate, therefore, provided is a method comprising a) mixing distilled water and an aqueous hydrazine ($H_2NNH_2$) solution in a reactor, b) feeding a metal salt solution containing a Mn salt and a metal salt selected from a group consisting of Ni, Co, Mg, Zn, Ca, Sr, Cu, Zr, P, Fe, Al, Ga, In, Cr, Ge and Sn, together with an aqueous ammonia solution, into the reactor, and c) adding a mixture of a carbonate solution and a hydrazine solution to the reactor to cause a coprecipitation reaction.

Also provided is a spheric manganese carbonate, represented by the following structural formula, having a spherical secondary structure:

$$(Mn_{1-x}M_x)CO_3$$

wherein M is a metal selected from a group consisting of Ni, Co, Mg, Zn, Ca, Sr, Cu, Zr, P, Fe, Al, Ga, In, Cr, Ge and Sn, and x is between 0.01 and 0.25, inclusive of both.

In the following, further detail explanations of the present invention are given.

The present invention pertains to the preparation of spheric manganese carbonates useful as a material for spinel-type $LiMn_2O_4$. In accordance with the present invention, manganese carbonates can be prepared in spheric form through $(Mn_{1-x}M_x)CO_3$ coprecipitation in the presence of hydrazine serving as a reducing agent. Without hydrazine, they may have an angular platy structure.

The preparation of $(Mn_{1-x}M_x)CO_3$ starts with the mixing of distilled water with an aqueous hydrazine ($H_2NNH_2$) solution. The aqueous hydrazine solution is preferably used in an amount from 0.5 to 4 vol %, and more preferably in an amount of about 2 vol % based on the volume of the distilled water. If the hydrazine solution is used in an amount less than 0.5 vol % based on the volume of the distilled water, angular platy manganese carbonate grows. On the other hand, more than 4 vol % hydrazine decreases the yield of spheric manganese carbonate. In addition to preventing the oxidation of manganese, the aqueous solution of hydrazine functions to increase the crystallinity of the resulting manganese carbonate and allows it to grow in spheric forms.

Below, the reaction mechanism according to the present invention is given.

$$2(Mn_{1-x}M_x)^{2+} + N_2H_4 + 4OH^- \rightarrow 2(Mn_{1-x}M_x) + N_2 + 4H_2O \quad (1)$$

$$(Mn_{1-x}M_x)^{2+} + mNH_3^{2+} \rightarrow [(Mn_{1-x}M_x)(NH_3)_n^{2+}](aq.) + (m-n)NH_3^{2+} \quad (2)$$

$$[(Mn_{1-x}M_x)(NH_3)_n^{2+}](aq.) + yCO_3^{2-} + zH_2O \rightarrow (Mn_{1-x}M_x)CO_3(s) + nNH_3^{2+} \quad (3)$$

As suggested in Reaction Formulas 1 to 3, hydrazine retards the rapid reaction of manganese with carbonate anions, thus forming spheric manganese carbonate particles.

Into a reactor, a metal solution comprising a salt of a metal selected from a group consisting of Ni, Co, Mg, Zn, Ca, Sr, Cu, Zr, P, Fe, Al, Ga, In, Cr, Ge and Sn and an Mn salt is fed, along with an aqueous ammonia solution. The metal solution comprising a salt of a metal selected from a group consisting of Ni, Co, Mg, Zn, Ca, Sr, Cu, Zr, P, Fe, Al, Ga, In, Cr, Ge and Sn and a Mn salt preferably has a concentration from 0.5 to 3 M. If the concentration of the metal solution is below 0.5 M, the yield is poor. On the other hand, if the concentration exceeds 3M, metal salts themselves precipitate due to a solubility difference, which makes it impossible to obtain spheric manganese complex carbonates.

As for the aqueous ammonia solution, it is preferably 0.1 to 0.8 M in concentration. If the concentration of the aqueous ammonia solution is lower than 0.1 M, a reaction occurs between the metal and the carbonate, but not for the production of spheric manganese carbonate. On the other hand, a concentration of the aqueous ammonia solution exceeding 0.8 M causes the coprecipitation of both carbonate and ammonia, leading to a decrease in the purity of the resulting metal carbonate. The reason why the concentration of the aqueous ammonia solution is set forth above is that ammonia reacts with metal precursors at a 1:1 molar ratio, but is recovered as an intermediate, so that local reaction with ammonia can be conducted at equal molar ratios. As such, the spherical metal carbonate which has the dense crystallinity is produced through the reaction of hydrazine and ammonia.

Separately, a carbonate solution and a hydrazine solution are mixed together, and the mixture is added into the reactor, aiming to adjust the pH of the overall reaction in the reactor to 6.5 to 8, which enjoys the advantage of increasing the crystallinity of the complex metal carbonate because the carbonate coprecipitation occurs in a neutral range. When the reaction is conducted at a pH lower than 6.5, the yield of the carbonate coprecipitation decreases. On the other hand, at a high alkaline range exceeding pH 8, carbonate coprecipitation occurs, with the concomitant coprecipitation of hydroxide, leading to a decrease in the purity of the complex metal carbonate of interest.

Preferably, 1-3 M carbonate solution is used. It is preferred that the overall reaction within the reactor be conducted for 2 to 20 hours. The carbonate used in the present invention is preferably selected from among ammonium hydrogen carbonate, sodium carbonate, ammonium carbonate and sodium hydrogen carbonate.

Through the processes illustrated above, precipitation occurs within the reactor, producing manganese carbonate. As known in the art, this coprecipitation utilizes a neutralization reaction in an aqueous solution to precipitate two or more elements simultaneously, so as to afford a complex carbonate. In accordance with an embodiment of the present invention, the reactants are controlled to stay for 6 hours on average within the reactor, with the pH maintained in the range from 6.5 to 8. Because the precipitation of manganese carbonate in a complex form at low temperature makes it difficult to yield a high density complex carbonate, the reactor is preferably maintained at 60° C.

The manganese carbonate produced in accordance with the present invention is found to have the structural formula of $(Mn_{1-x}M_x)CO_3$ (wherein M is selected from a group consisting of Ni, Co, Mg, Zn, Ca, Sr, Cu, Zr, P, Fe, Al, Ga, In, Cr, Ge and Sn, and $0.01 \leq x \leq 0.2$) and be spherical in morphology. The spheric manganese carbonate is useful as a material for spinel-type $Li[Mn_{1-x}M_x]_2O_4$ which shows no structural transition and excellent lifetime characteristics.

MODE FOR INVENTION

A better understanding of the present invention may be obtained through the following examples, which are set forth to illustrate, but are not to be construed as the limit of the present invention.

Example 1

Into a coprecipitation reactor (capacity 4 L, equipped with a 80 W rotary motor) was poured 4 liters of distilled water, followed by the addition of 80 ml of a 0.32 M aqueous hydrazine ($H_2NNH_2$) solution to the distilled water. Nitrogen gas was supplied at a rate of 1 liter/min to generate bubbles within the reactor, so as to remove dissolved oxygen while the reaction was maintained at 50° C. and stirred at 1,000 rpm.

Both a 1 M metal salt solution, in which manganese sulfate was mixed with magnesium sulfate at a 0.95:0.05 molar ratio, and a 0.5M aqueous ammonia solution were fed at a rate of 300 mL/hr into the reactor. 5 liters of a 2M ammonium hydrogen carbonate ($NH_4HCO_3$) and 100 ml of a 0.32M hydrazine solution were mixed so as to adjust the pH of the reaction to 7.

An impeller was set to have a speed of 1,000 rpm to allow the solution to stay in the reactor for 6 hours on average. After the reaction reached a steady state, it was maintained thus for a predetermined period of time to yield spheric manganese carbonate, represented by the structural formula ($Mg_{0.05}Mn_{0.95}$)$CO_3$.

Comparative Example 1

After 4 liters of distilled water was poured into a coprecipitation reactor (capacity 4 L, equipped with a 80 W rotary motor), nitrogen gas was supplied at a rate of 1 liter/min to generate bubbles within the reactor, so as to remove dissolved oxygen while the reaction was maintained at 50° C. and stirred at 1,000 rpm.

Both a 1 M metal salt solution, in which manganese sulfate was mixed with magnesium sulfate at a 0.95:0.05 molar ratio, and a 0.5M aqueous ammonia solution were fed at a rate of 0.3 L/hr to the reactor. The reaction was bubbled with 2M ammonium hydrogen carbonate ($NH_4HCO_3$) so as to adjust the pH of the reaction to 7.

An impeller was set to have a speed of 1,000 rpm to allow the solution to stay in the reactor for 6 hours on average. After the reaction reached a steady state, it was maintained for a predetermined period of time to afford angular platy manganese carbonate, represented by the structural formula ($Mg_{0.05}Mn_{0.95}$)$CO_3$.

Figure 2:
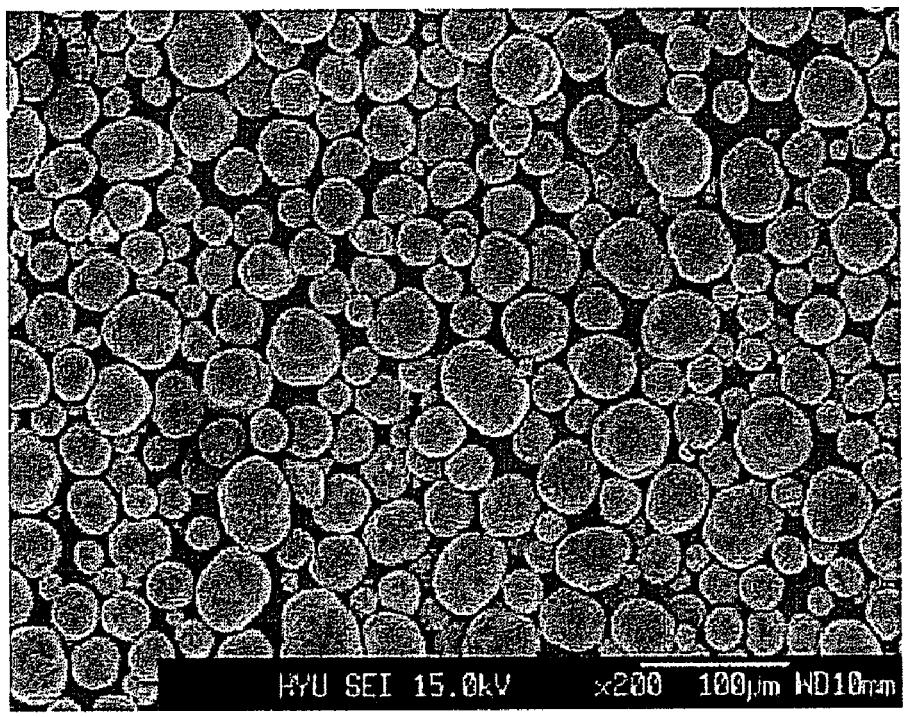
FIG. 2 is an FE-SEM photograph of 200 power magnifications showing the surface morphology of the $(Mn_{0.95}Mg_{0.05})_2O_3$ precursor obtained by calcining a powder of the manganese carbonate of the present invention for 10 hours at 500° C.
Figure 3:
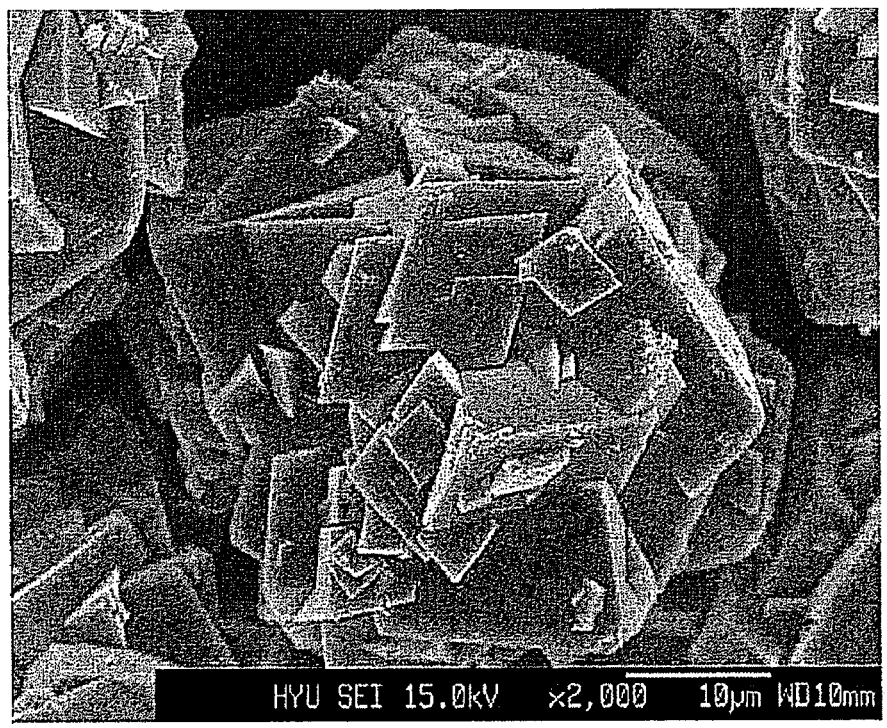
FIG. 3 is an FE-SEM photograph of 3,000 power magnifications showing the surface morphology of the $(Mn_{0.95}Mg_{0.05})_2O_3$ precursor obtained by calcining for 10 hours at 500° C. a powder of the manganese carbonate prepared without the use of a hydrazine solution.
Figure 4:
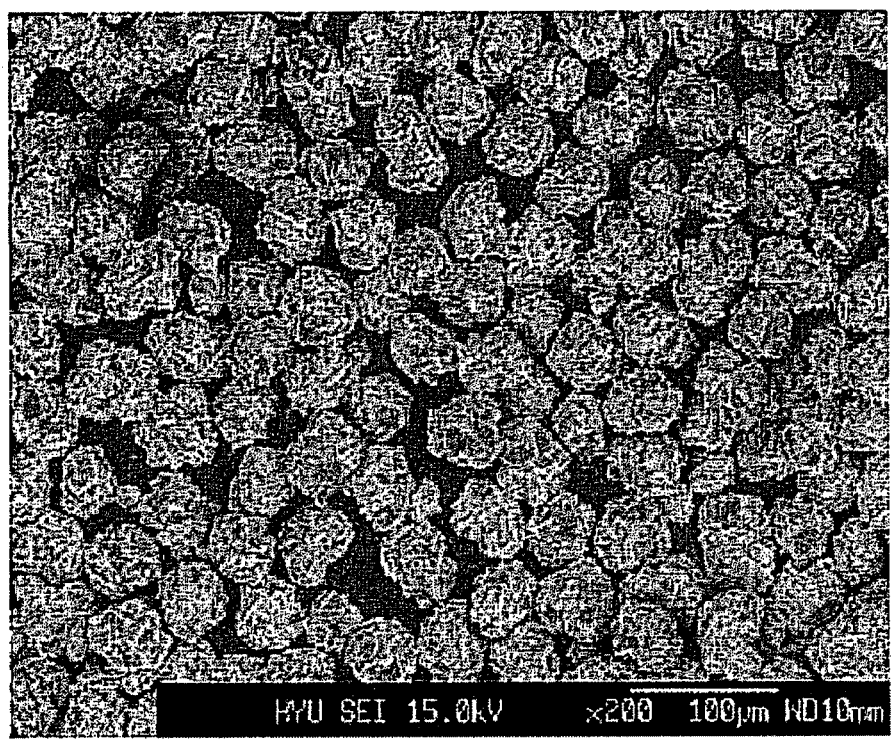
FIG. 4 is an FE-SEM photograph of 200 power magnifications showing the surface morphology of the $(Mo_{0.95}Mg_{0.05})_2O_3$ precursor obtained by calcining for 10 hours at 500° C. a powder of the manganese carbonate prepared without the use of a hydrazine solution.

FIGS. 1 and 2 are FE-SEM photographs showing the surface morphology of the ($Mn_{0.95}Mg_{0.05}$)$_2CO_3$ precursor obtained by calcining at 500° C. for 10 hours the powders of the manganese carbonates prepared in Example 1 and Comparative Example 1, respectively. As shown in these photographs, the manganese carbonate of Comparative Example 1, obtained in the absence of hydrazine, was found to appear as secondary particles having irregular angular platy structures resulting from the growth of primary particles into an angular platy form. However, The manganese carbonate of Example 1, obtained in the presence of hydrazine, was obtained in the form of mono-dispersed spherical particles.

The complex manganese carbonates prepared in Example 1 and Comparative Example 1 were loaded into respective mass cylinders, and packed into the mass cylinders by applying a predetermined load 200 times thereto. Tap densities were calculated by measuring the volumes of the complex manganese carbonates, and are given in Table 1, below.

TABLE

|  | Tap Density |
| --- | --- |
| Example 1 | 1.9 g/ml |
| Comparative Example 1 | 1.5 g/ml |

Although the preferred embodiment(s) of the present invention have(has) been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing spheric complex manganese carbonate for cathode active materials of a lithium secondary battery, the cathode active materials having a spinel crystal structure, the method comprising:
    a) mixing distilled water and an aqueous hydrazine ($H_2NNH_2$) solution in a reactor, the aqueous hydrazine ($H_2NNH_2$) solution being used in an amount from 0.5 to 4-vol % based on the total volume of the distilled water,
    b) feeding into the reactor a metal salt solution together with an aqueous ammonia solution having a concentration from 0.1 to 0.8 M., wherein the metal salt solution contains an Mn salt and a metal salt at a molar ratio represented by $Mn_{1-x}M_x$, wherein M is a metal selected from the group consisting of Ni, Co, Mg, Zn, Ca, Sr, Cu, Zr, P, Fe, Al, Ga, In, Cr, Ge and Sn, and x is between 0.01 and 0.25 inclusive, and
    c) adding a mixture of a carbonate solution and a hydrazine solution to the reactor to cause a coprecipitation reaction.

2. The method as set forth in claim 1, wherein the metal salt solution of step b) has a concentration from 0.5 to 3 M.

3. The method as set forth in claim 1, wherein the carbonate solution of step c) has a concentration from 1 to 3 M.

4. The method as set forth in any one of claims 1 or 2, wherein the coprecipitation reaction is conducted at a pH from 6.5 to 8.

5. The method as set forth in claim 1, wherein the carbonate salt of step c) is selected from among ammonium hydrogen carbonate, sodium carbonate, ammonium carbonate and sodium hydrogen carbonate.

* * * * *